Jan. 10, 1928.
B. E. ELDRED
1,655,811
PHOTOPHONOGRAPHIC APPARATUS
Original Filed May 28, 1924
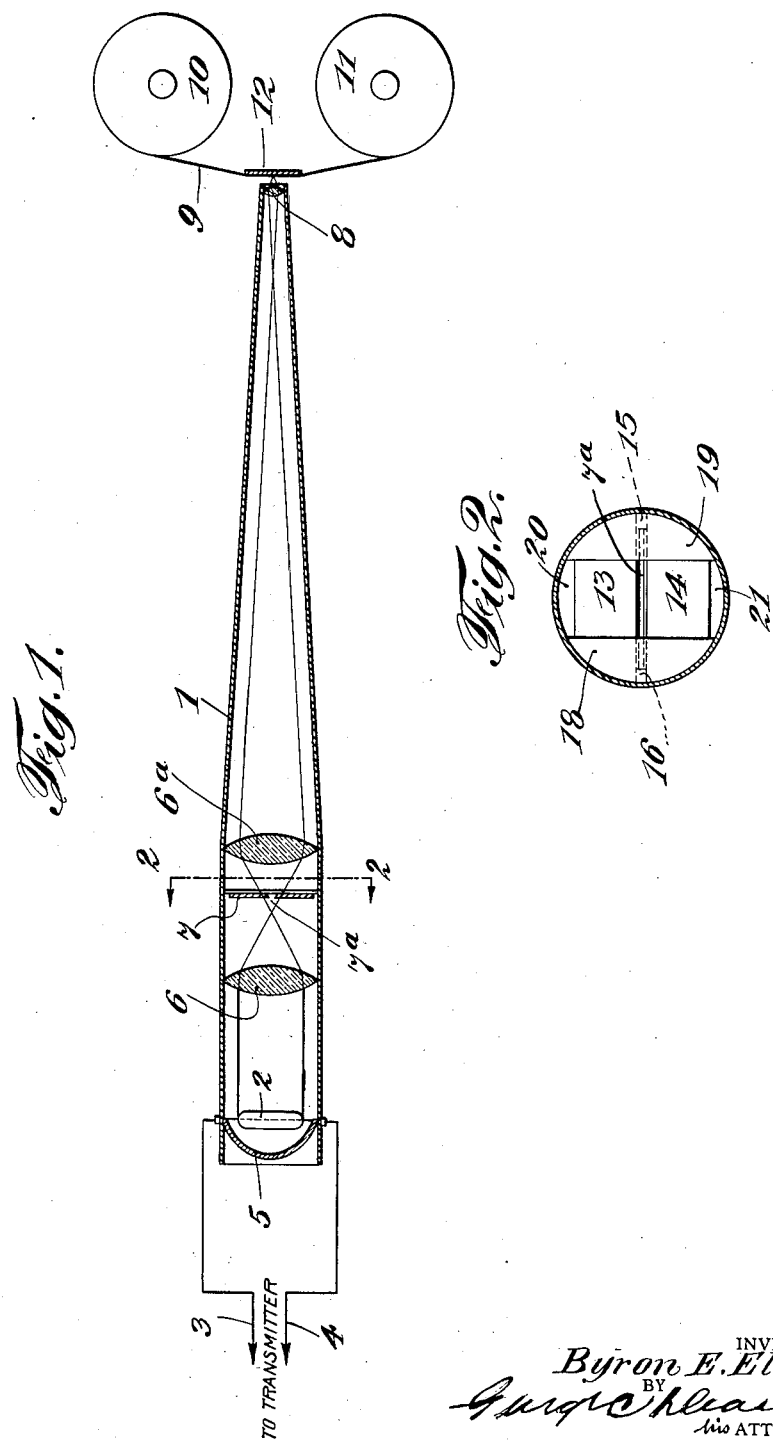
INVENTOR
Byron E. Eldred
BY
his ATTORNEY Patented Jan. 10, 1928.

1,655,811

UNITED STATES PATENT OFFICE.

BYRON E. ELDRED, OF NEW YORK, N. Y.

PHOTOPHONOGRAPHIC APPARATUS.

Original application filed May 28, 1924, Serial No. 716,296. Divided and this application filed April 2, 1927. Serial No. 180,378.

My present invention includes recording sound by employing a source of light varied by and in accordance with the sound variations and a photographic film on which said variations are recorded, and reproducing sound from such a record by means of a beam of light varied by and in accordance with the film record and projected upon a light sensitive cell, the variations of which are translated into sound through an audio frequency amplifier and a telephone receiver of the ordinary head 'phone type, or the loud speaker type. The elements so far as named may be any of those already well known in the art.

As in my prior application, Ser. No. 716,-296, filed May 28th, 1924, of which this case is a division, the object of my present invention is to provide means whereby more clearly defined, more sharply differentiated records of sound variations may be recorded upon a light sensitive film and also, if desired, a greater percentage of the corresponding vibrations of the original sound may be recorded.

Another object of the invention is to obviate a serious difficulty in present-day photophonographic recording, which is the contacting of the emulsion side of the film, as it is rapidly moved, with the surface of a stop element having a slot through which the recording light beam is passed. Such contacting tends to produce scratches on the film which impair the quality of the record.

The important difficulties presented in photophonographic recording of sound in the past have arisen because of the fact that frequencies of useful sound vary from approximately 100 up to 4,000 or 5,000 complete vibrations per second. To record the higher frequencies by means of light passed through an opening in a light shield or stop, to protect the recording film, and to pass only the light being used for the purpose of the record, two necessary correlated factors must be established, which are speed of film travel and width of the light passing orifice.

Assuming this light admitting orifice to be a slit 1/1000 of an inch opening lengthwise of the film, a speed of film of over 125 feet per minute would be required for the proper recording of the higher frequencies above mentioned. Moreover, a slit of 1/1000 of an inch is in itself difficult to construct because to serve the purpose of a light screen, and provide a stable contacting surface for the fast moving film, the material in which this slit is made must be of substantial proportions. These requirements have heretofore entered into photophonic recording and have involved difficulties due to refracted or leaking light which prevented sharply defined records with consequent noisy and not wholly satisfactory reproduction from such records.

My present invention provides optical reducing or concentrating means which collects and delivers to the film the light passed by the slit, as it is variably illuminated in accordance with the sound, in photographic form of a projected real image with all or any of the degree of sharpness and refinement desired and readily secured by means now available by reason of the present high state of development of the art of photography. This new method may be differentiated from the old as that of projecting and photographing a real image of the window or slit under varying illuminations as against that of similarly producing crude shadowgraphs. A slit of ample proportions may now be employed instead of the necessary limited slit of the prior art. The optical reducing system entered between the slit and the film for recording provides means for accomplishing the reduction of the light beam passing the slit to any desired width. This means allows of the recording of a far greater percentage of the sound vibrations and allows the passing of a practically unrestricted volume of light for effecting the photographic record. Photophonographic records having exceedingly sharp contrasts may be secured or delicate soft shadings are thus made possible.

One result is that with more light concentrated by the real image projecting system, a "slower" emulsion film may be used, presenting fewer emulsion grains. This is an advantage quite distinct from those set forth in my application Ser. No. 166,622, wherein I obviate the difficulty presented by the grains of the negative film of the primary record by recording at a sufficiently greater speed than is desired for reproduction so that in effect a large scale record is provided on the primary master film, thus affording correspondingly wide exposure bands of exposed and unexposed film. This prime master film I then reduce by optical means or use it as a control to effect the reproduction of a sub-master film in condensed form whereon the record of sound may be produced at any speed desired, thus providing a record of sound of any suitable dimensions upon a colloidal or non-grain emulsion film freed from objectionable grains of the ordinary speed film. It will be obvious that this method presents a condition where the size of the prime master record impressed upon the film may be varied at will while the grain structure remains a constant. The exposure time element of primary recording necessitates speed or grain film, while the sub-master recording eliminates the time factor and allows of the use of the more suitable non-grain film. Even in this process, my present method may be usefully employed.

Records of sound made by my present method may be taken simultaneously with motion picture films, and printed upon the margins thereof, either to provide speaking moving pictures, so-called, or to furnish suitable contemporary music with such motion pictures Among other advantages, my invention provides for employing an ample volume of light while recording high frequency vibrations, and in likewise providing means which allows of the free movement of the emulsion covered surface of the recording film out of contact with a rubbing surface which has produced scratched films heretofore.

While I have employed a light passing slit in my description, I wish it understood that I do not limit myself to the use of any special means of illumination or light source.

The above and other features of my invention may be more fully understood from the following description in connection with the accompanying drawings, in which Fig. 1 is a diagrammatic view of the recorder; and Fig. 2 is a section on the line 2—2, Fig. 1, showing in detail a slot construction that may be employed.

Referring to Fig. 1, the recording projector includes reducing camera means and is diagrammatically indicated as including an enclosing tube 1, containing a lamp 2, which may be any vacuum lamp of the type new well known in the art as capable of varying its radiation by and in accordance with sound variations. The sound variations and the keep alive current may be supplied from any suitable transmitting apparatus through the wires 3, 4. In the rear of the lamp 2 the casing 1 may be closed in by a reflector 5. The light, either direct or reflected, is centered by a lens 6, which in this case is shown as double convex. Beyond the focus where the converging rays cross and in a plane where a reduced image of the lamp will be formed, I arrange the slotted diaphragm 7 which cuts out as much of the image and light from lamp 2 as may be desired. The light which passes through the slot is further concentrated by the reducing lens $6^a$ and a final reducing lens 8. The film 9, supplied from and moved by reels 10, 11, is guided in a predetermined plane by suitable support 12. The plane of the face of the film may be as near as desired to the focal or crossing point of the rays from lens 8, but preferably in a plane where a real image of the slot is formed.

It will be noted that I have not attempted to follow the divergence, convergence and crossing points of the light through the slot $7^a$ of diaphragm 7, but have taken the extreme lines of the image of the lamp as indicating the cones and focuses characteristic of said image.

It will be evident that the nearer the receiving surface of film 9 is to the focus of lens 8, the more concentrated the light will be. Consequently, it may be desirable to utilize the well known expedient of screens for absorbing the heat rays in the beam and the light may of course be stopped down by diaphragms to any desired extent.

While my invention permits the use of a slot large enough to avoid mechanical difficulties in its production, one arrangement usable for this purpose is diagrammatically indicated in Fig. 2. Here the diaphragm comprises circular screens 13, 14, which are semi-circles except for the slot space $7^a$ between them. Spacers 15, 16 of any desired thickness may be employed, against which the screens may be forced to insure proper spacing and parallelism of the slot edges. The slot may be stopped down if desired by segmental pieces 18, 19, which may be also positioned by spacers 20, 21.

I claim:—

1. Apparatus for photophonographic recording of sound, including means for varying the light by and in accordance with the sound variations, reducing camera means for forming an image of the light source, an apertured diaphargm whereby a selected portion of the light capable of forming said image is allowed to pass and the remainder stopped out and further reducing camera means whereby an image of the aperture is projected to form a focused real image on a recording film.

2. Apparatus for photophonographic recording of sound, including means for varying the light by and in accordance with the sound variations, apertured means through which a portion of said light is projected and reducing camera means whereby a reduced image of the aperture is projected to form a focused real image upon a sensitive recording film.

Signed at New York in the county of New York and State of New York this 31st day of March, A. D. 1927.

BYRON E. ELDRED.